C. W. OLSON.
VEHICLE BRAKE.
APPLICATION FILED JUNE 17, 1909.
963,930.
Patented July 12, 1910.
2 SHEETS—SHEET 1.
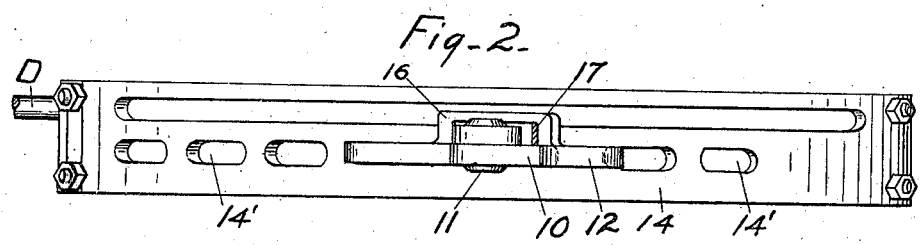
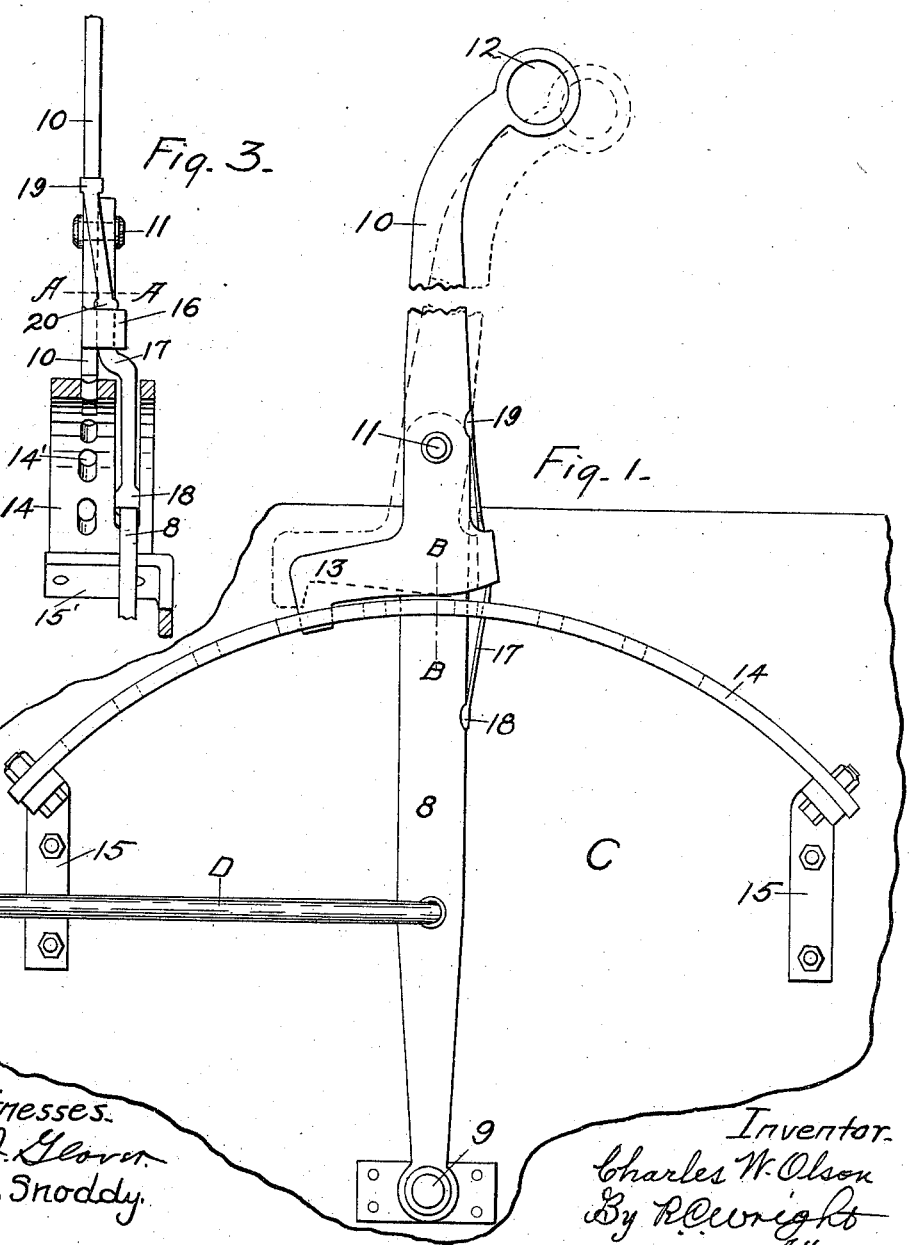
Witnesses.
T. J. Glover.
J. C. Snoddy.
Inventor.
Charles W. Olson
By R. C. Wright
Attorney.

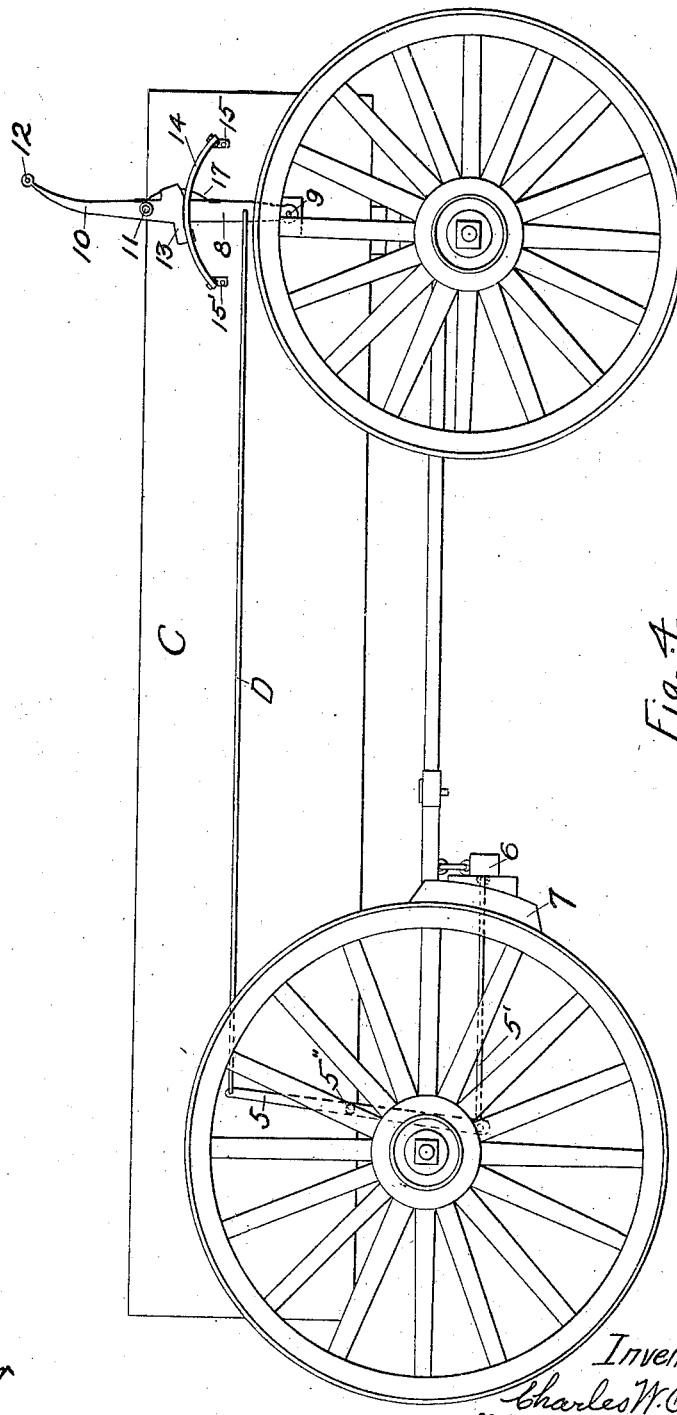

UNITED STATES PATENT OFFICE.

CHARLES W. OLSON, OF PORTLAND, OREGON, ASSIGNOR OF ONE-HALF TO CHARLES LINGE, OF PORTLAND, OREGON.

VEHICLE-BRAKE.

963,930.  Specification of Letters Patent. Patented July 12, 1910.

Application filed June 17, 1909. Serial No. 502,748.

*To all whom it may concern:*

Be it known that I, CHARLES W. OLSON, a citizen of the United States, residing at Portland, in the county of Multnomah, State of Oregon, have invented a new and useful Vehicle-Brake, of which the following is a specification, reference being had to the drawings which form a part hereof.

My invention relates to improvements in vehicle-brakes in which there is provided a mechanism of pawl and ratchet type for setting and releasing the brake.

The object of my invention is to provide in a vehicle-brake an extremely simple mechanism of cheap construction, in which the brake-handle is moved to release the brake and to set it without auxiliary latches or levers to be moved by the hand in doing this. Also to provide a brake capable of being operated from a lead wagon having a line connected with the brake-handle of a following wagon. I attain these objects by the construction, combination and arrangements of parts illustrated in the accompanying drawings, in which—

Figure 1 is a side view of the brake-operating device and part of a wagon body to which the same is secured. Fig. 2 is a plan view of the same mechanism but with the spring 17 in section on the line A—A of Fig. 3. Fig. 3 is an end view of said mechanism with the quadrant 14 in section on the line B—B of Fig. 1. Fig. 4 is a side view of my device with the brake attached in working position on the side of a vehicle.

Like letters and numerals refer to like parts in the views.

C is a wagon box.

D is a connecting rod pivoted on the upper end of a lever 5, the lower end of said lever being connected by a rod 5′ to a brake beam 6, having a brake-shoe 7. The lever 5 is pivoted on the wagon box by the pivot 5″. The forward end of the rod D is pivotally secured near the center of a vertical lever 8 of the brake-operating mechanism.

8 is a vertical lever mounted at its lower end on a pivot 9.

10 is an operating handle pivoted near its lower end upon the upper part of the lever 8 by the pivot 11. This handle may have a ring 12 at its upper end. Its lower end is formed as a pawl 13.

14 is a quadrant provided with a ratchet 14′ to receive the pawl 13 in engagement therewith. The quadrant is secured to the side of the wagon box by the brackets 15—15′.

A strap 16 is secured to the handle 10 below its pivot 11 and extends horizontally around the lever 8. A spring 17 extends under the strap 16 with its lower end bearing against the lever 8 and its upper end against the handle 10. Shoes 18 and 19 of the spring, partially envelop the lever 8 and handle 10. The spring is provided with a shoulder 20 (Fig. 3), which engages the upper edge of the strap 16 and retains the spring in a fixed position. It will now be seen that when power is applied to the handle 10, for example either by grasping with the hand or by pulling a line which may be secured in the ring 12, the forward movement of the handle overcomes the pressure of the spring 17, the pawl 13 is raised and released from engagement with the ratchet 14′ of the quadrant 14. The pivot 11 becomes the fulcrum of the handle and the lower part of the handle engages the lever 8 by means of the strap 16 and thus moves the lever 8 firmly forward. The lever 8 in turn draws the rod D forward and thus actuates the brake mechanism and sets the shoes against the wheels. When the brake-shoe 7 is set against the wheel as tightly as desired the handle 10 is quickly released and being at once pressed backward by the spring 17, the pawl 13 engages the ratchet 14′ and the brake remains set in the position desired. If the brake is to be released the handle is pressed forward in the same manner just described and then allowed to slowly move backward. The pawl then moves backward over the ratchet 14′ without engaging the same and the rod D being released from tension, it in turn releases the lever 5 and the shoe 7 is moved away from engagement with the wheel.

It will be noted that the quadrant may be reversed and the brake-operating mechanism placed upon the opposite side of the wagon body. It will be further noted that my lever mechanism is particularly adapted for use on a vehicle being hauled by another. A line then extending from the forward vehicle to the brake lever on the rear one, easily controls the mechanism.

Having thus described my invention, I claim:

1. In a vehicle-brake, operating mechanism comprising a vertical lever 8 pivoted at its lower end, a handle 10 pivoted near its lower end upon the upper part of the lever 8, said handle being formed with a pawl 13 on its lower end and with or without a ring on its upper end, also having a strap 16 secured upon it below its pivot and extending horizontally around the lever 8, a spring 17 extending under said strap, its lower end bearing against the lever 8, its upper end against the handle 10 and formed with shoes to retain it in engagement with the lever and handle, and a shoulder to engage the strap and retain the spring in a fixed position, also a quadrant 14 fixedly secured at the side of the lever 8 beneath the pawl 13 and formed with a ratchet arranged in position to engage the pawl, substantially as described.

2. In a vehicle-brake the combination of a handle 10 pivoted on a brake-operating lever, and having a pawl at its lower end and a strap 16 enveloping the lever below the point of pivot, a spring 17 extending under the strap, its lower end bearing against the lever, its upper end against the handle and formed with shoes to retain it in engagement with the lever and handle and a shoulder to engage the strap and retain it in fixed position, also a quadrant 14 fixedly secured at one side of the lever beneath the pawl and formed with a ratchet arranged in position to engage the pawl, substantially as described.

3. In a vehicle-brake the combination with brake mechanism, of brake-operating mechanism comprising a vertical lever 8 pivoted at its lower end, a handle 10 pivoted near its lower end upon the upper part of the lever 8, said handle being formed with a pawl 13 on its lower end and with or without a ring on its upper end, also having a strap 16 secured upon it below its pivot and extending horizontally around the lever 8, a spring 17 extending under said strap, its lower end bearing against the lever 8, its upper end against the handle 10 and formed with shoes to retain it in engagement with the lever and handle, and a shoulder to engage the strap and retain the spring in a fixed position, also a quadrant 14 fixedly secured at the side of the lever 8 beneath the pawl 13 and formed with a ratchet arranged in position to engage the pawl, substantially as described.

CHARLES W. OLSON.

Witnesses:
H. P. BORDERS,
J. W. BORDERS.